United States Patent [19]
Haka

[11] Patent Number: 5,803,859
[45] Date of Patent: Sep. 8, 1998

[54] POWERTRAIN WITH PLANETARY GEARING AND A CONTINUOUSLY VARIABLE RATIO UNIT

[75] Inventor: Raymond James Haka, Brighton, Mich.

[73] Assignee: General Motors Corporation, Detroit, Mich.

[21] Appl. No.: 862,882

[22] Filed: May 23, 1997

[51] Int. Cl.$^6$ ............................................. F16H 37/02
[52] U.S. Cl. ......................... 475/211; 475/210; 475/218
[58] Field of Search .................................. 475/207, 210, 475/211, 214, 215, 218; 474/72, 73, 11

[56] References Cited

U.S. PATENT DOCUMENTS

| | | | |
|---|---|---|---|
| 4,550,629 | 11/1985 | Kawamoto | 475/210 |
| 4,644,821 | 2/1987 | Sumiyoshi et al. | 475/211 X |
| 4,836,049 | 6/1989 | Moan | 475/211 X |
| 4,856,369 | 8/1989 | Stockton | 74/665 GE |
| 5,470,285 | 11/1995 | Schneider et al. | 475/210 |
| 5,669,846 | 9/1997 | Moroto et al. | 475/211 |

*Primary Examiner*—Charles A. Marmor
*Assistant Examiner*—Peter T. Kwon
*Attorney, Agent, or Firm*—Donald F. Scherer

[57] ABSTRACT

A torque converter and a planetary gear arrangement are positioned in serial power flow relation between an engine and a final drive. A continuously variable unit (CVU) is positioned for serial power flow between a torque converter clutch and the final drive. The power path of the CVU includes a direct clutch which, when engaged, connects the CVU with the output member of the planetary gear arrangement. The power flow path of the planetary gear arrangement includes a one-way clutch which permits overrunning of the planetary input member when the direct clutch is engaged.

4 Claims, 1 Drawing Sheet

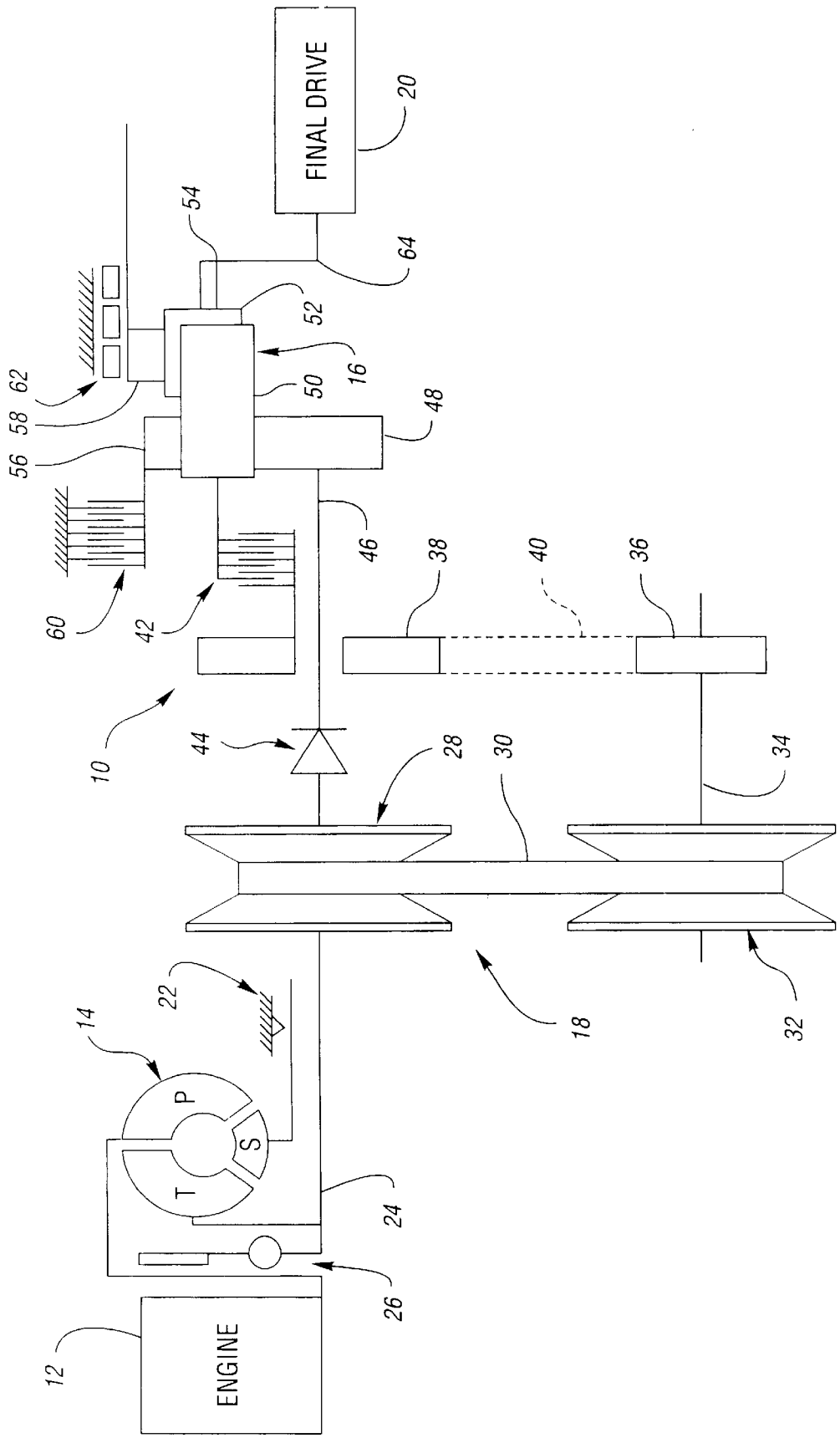

POWERTRAIN WITH PLANETARY GEARING AND A CONTINUOUSLY VARIABLE RATIO UNIT

TECHNICAL FIELD

This invention relates to powertrains having a planetary gear path for high torque flow and a continuously variable unit (CVU) path for low torque power flow.

BACKGROUND OF THE INVENTION

The use of continuously variable units (CVU) is becoming increasingly popular in small motor vehicles. The CVU generally has a pair of spaced sheave assemblies with a flexible member, such as a rubber, fabric or steel belt, entrained on the sheaves for transmitting drive force from the input to the output. The sheave assemblies each have an axially movable half which permits a variation of the sheave diameter at which the flexible member contacts the sheave. This permits a change in speed ratio between the CVU input and output. Since the diameters can be varied by minute amounts, the drives have been termed continuously variable.

CVUs have been popular in small offroad vehicles, such as golf carts, snow mobiles and garden tractors. These vehicles have low torque engines which do not overstress the rubber or fabric flexible member, thus permitting the use of rubber or fabric belts. These flexible members transmit torque between the sheaves on the tension side of the member.

More recently, steel belts have become commercially feasible and permit higher torque levels to be transmitted. These belts have higher torque capacity than the flexible belt. However, these devices also have torque capacity limitations. The torque capacity limitation is dependent upon the frictional characteristics of the belt and pulleys or sheaves, as well as structural features. The steel belts transmit torque on the compression side and can be cooled and lubricated with a liquid medium.

SUMMARY OF THE INVENTION

It is an object of the present invention to provide an improved powertrain having a power path for high torque power flow and a continuously various unit (CVU) power path for low torque power flow. In one aspect of the invention, a powertrain has an engine drivingly connected with a torque converter and clutch. The torque converter drives a sun gear in a Ravigneaux type planetary gearing arrangement. A pair of ring gears are provided as selectively actuated reaction members and a carrier assembly is connected with a powertrain output or final drive.

One ring gear provides reaction in the forward ratio while the other ring gear provides reaction in a reverse ratio. A CVU is disposed between the torque converter and clutch and a direct clutch of the planetary gear arrangement. When the direct clutch is engaged, a one-way device permits disconnection of the planetary sun gear from the torque converter. During CVU operation, the torque converter clutch is engaged.

Engagement of the direct clutch occurs at a speed synchronous point which is achieved at approximately a two percent slip at the torque converter.

BRIEF DESCRIPTION OF THE DRAWINGS

The drawing is a diagrammatic representation of a powertrain incorporating the present invention.

DESCRIPTION OF AN EXEMPLARY EMBODIMENT

A powertrain, generally designated 10, is shown in the drawing. The powertrain includes an engine 12, a torque converter 14, a planetary gear arrangement 16, a continuously variable transmission unit 18, and a final drive arrangement or gearing 20.

The engine 12 is a conventional internal combustion device and, in at least one embodiment, will have an output of at least 375 Nm. The torque converter 14 is a conventional hydrodynamic fluid drive device having a pump "P", a turbine "T" and a stator "S". The stator "S" is selectively grounded through a one-way brake 22 during the torque conversion phase of the torque converter 14, and is free to rotate forwardly in the direction of the pump and turbine during the coupling phase of the hydrodynamic drive. The pump "P" is connected directly with the output of the engine 12. The turbine "T" is connected to a transmission input shaft 24. Also connected with the shaft 24, is a torque converter clutch 26. As is well known, torque converter clutches are engaged to connect the pump "P" and turbine "T" directly together and directly to the engine output.

The transmission input shaft 24 is drivingly connected with a conventional variable sheave member 28 which is a part of the CVU 18. The sheave member 28 is connected with a conventional steel belt 30 to an output sheave assembly 32. The output sheave assembly 32 is also a conventional device. The sheaves 28 and 32, as is well known, can be varied in operating diameter by moving one sheave half axially relative to the other.

Generally, the control system will manipulate the half sheave of sheave assembly 28 and the sheave assembly 32 will be placed in a follower relationship, such that the ratio between the sheaves can be adjusted. As a common practice, the underdrive or low ratio of the CVU 18 is approximately 2.38:1 while the overdrive ratio is approximately 0.42:1.

The sheave assembly 32 has an output shaft 34 which is drivingly connected with a sprocket 36. A sprocket 38 is connected with the sprocket 36 through a conventional toothed chain 40. A direct clutch 42 is connected with the output of sprocket 38. An underdrive ratio is provided from the sprocket 36 to the sprocket 38, such that the sprocket 38 always rotates at a speed less than the sprocket 36.

The transmission input shaft 24 is drivingly connected with one half of a conventional one-way clutch 44, the other half of which is connected to a planetary gear input shaft 46. The shaft 46 is drivingly connected with a sun gear 48 of the planetary gear arrangement 16. Those familiar with the art will recognize the planetary gear arrangement 16 is of the Ravigneaux type, that is, the gearing has a long pinion 50 meshing with a short pinion 52. Both of the pinions 50 and 52 are rotated on a carrier 54.

The long pinion 50 meshes with the sun gear 48 and with a ring gear 56. The short pinion 52 meshes with a ring gear 58. The ring gear 56 is selectively held stationary to become a reaction member by a fluid operated friction brake 60 and the ring gear 58 is selectively held stationary by a conventional double wrap band brake 62. The double wrap band 62 is also a fluid operated device as is the direct clutch 42. These friction devices represented by clutch 42, brake 60 and brake 62 are conventional mechanical assemblies which are well known to those skilled in the art.

The carrier 54 of the planetary gear arrangement 16 is connected to one side of the clutch 42 and also to a transmission output shaft 64 which is then connected with the final drive 20. The final drive 20 can take the form of a conventional gear differential, if desired, such that two output axles would be provided and the differential permits a speed difference between the axles for various vehicle maneuvering.

In the exemplary embodiment shown, the brake 60 is engaged to establish a forward ratio in the planetary gear arrangement 16. By providing the thirty teeth on the sun gear 48 and seventy-four teeth on the ring gear 56, a forward underdrive ratio of approximately 3.47 is provided between the shaft 46 and the shaft 64.

The brake 62 is selectively engaged to establish the ring gear 58 as a reaction member during reverse operation. By providing the ring gear 58 with one hundred and ten teeth, a reverse ratio of minus 2.67 is provided between the shaft 46 and the shaft 64.

During operation of the vehicle incorporating the powertrain 10, the forward or reverse brake is established and the vehicle is launched. During forward operation, the brake 60 is engaged and the torque converter supplies a torque multiplication between the engine 12 and the sun gear 48.

As is well known, torque converters have a torque ratio and a speed ratio when operating in the torque converter mode. In the exemplary embodiment, the torque converter 14 is designed to have a maximum stall torque ratio of 2.5. That is, when the turbine is stationary and the pump "P" is rotating due to engine input, a torque multiplication of engine torque occurs. In the embodiment described, an engine torque of 375 Nm maximum and the torque converter 14 at stall will produce a torque of approximately 937 Nm at the sun gear 48. Due to the lowered reduction 3.47 of the planetary gear arrangement 16, an output torque of approximately 3250 Nm will be present at the final drive 20. Thus, the high torque output of the powertrain 10 occurs when the planetary gear arrangement is in operation.

As the torque converter 14 approaches the coupling stage, the torque ratio decreases while the speed ratio increases. At the coupling phase, which occurs at approximately two percent slip, a torque multiplication of one is present such that the sun gear 48 would receive 375 Nm from the engine and the output final drive 20 would receive a torque of approximately 1301 Nm.

When the torque converter 14 is at coupling phase, the direct clutch 42 can be engaged as can the torque converter clutch 26. With the direct clutch 42 engaged, the CVU 18 provides a torque multiplication of approximately 2.38 to the engine torque thereby providing an output torque at sprocket 36 of approximately 890 Nm. The sprocket 38, due to the underdrive ratio, receives approximately 1320 Nm. With the direct clutch 42 engaged, the output or final drive 20 will receive 1320 Nm of torque, approximately.

As is well known with torque converters, the pump "P" rotates faster than the turbine "T". There is always some slip speed or some speed ratio, very slight, between the pump "P" and turbine "T" during the coupling phase. This is generally expressed as a slip speed or a slip ratio or a slip percent. At two percent slip, the turbine "T" rotates at a speed two percent slower than the pump "P".

With the ratios provided in the exemplary embodiment, the output shaft 64 is rotating at essentially the same speed whether it is the result of the forward reduction in the planetary gear arrangement 16 or the output from the CVU 18. There may be some minor speed differences between these two devices. These minor speed differences can be accounted for and accommodated by controls within the transmission. Such controlling devices are well known. For example, the direct clutch 42 can be brought into slipping engagement to account for the speed differential. Also, the CVU 18 has a control unit which can affect the ratio between the sheave 28 and the sheave 32.

This control function can adjust the ratio sufficiently to accommodate the speed differences that might occur at the carrier 54, depending on whether the drive is through the planetary or through the CVU. Thus, the shift, if it might be considered an upshift from the planetary gearing to the CVU 18, occurs at essentially a synchronous speed. Once the CVU 18 is activated, the drive ratio between the input shaft 24 and the output shaft 64 is effected by changing the ratio in the CVU 18. As previously mentioned, this ratio is changed essentially continuously between 2.38 underdrive and 0.420 overdrive. This provides an overall ratio of approximately 5.7 throughout the range of the CVU 18.

It should be noted that the CVU 18 is only operative when the output torque required at the final drive 20 is in a low requirement load. During vehicle launch or during significant hill climb, the planetary gear arrangement 16 is brought into play and the CVU 18 is disengaged from torque transmission.

When the CVU 18 is operating, the sprocket 38 provides the input speed to the planetary carrier 54. When the input speed of the sprocket 38 increases due to the ratio change in the CVU 18, the sun gear 48 will attempt to speed up. The one-way clutch 44 will permit this speed difference between the shaft 46 and the shaft 24.

If the sun gear 48 attempts to rotate slower than the shaft 24, this will not be permitted and the ring gears 56 and 58 will accommodate the speed differences that might be necessary.

I claim:

1. A powertrain comprising;
    an engine having an output shaft;
    a torque converter having an input member drivingly connected with said engine output shaft and an output member;
    a direct clutch selectively engageable to connect said engine output shaft with said output member;
    a continuously variable transmission having an input sheave drivingly connected with said output member and an output sheave;
    a planetary gear arrangement having an input member, an output member, a rotatary member and first and second reaction members;
    a one-way clutch device selectively connecting said planetary input member with said torque converter output member; and
    a selectively engageable clutch for selectively connecting said output sheave with said rotary member of said planetary gear arrangement.

2. A powertrain comprising;
    an engine having an output shaft;
    a powertrain output shaft;
    a torque converter having an input member drivingly connected with said engine output shaft and an output member;
    a direct clutch selectively engageable to connect said engine output shaft with said output member;

a continuously variable transmission having an input sheave drivingly connected with said output member and an output sheave drivingly connected with said powertrain output shaft;

a planetary gear arrangement having an input member, an output member drivingly connected with said powertrain output shaft, a rotary member, first reaction member and second reaction member;

a one-way clutch device selectively connecting said planetary input member with said torque converter output member; and a selectively engageable clutch for selectively connecting said output sheave with said rotary member of said planetary gear arrangement, said selectively engageable clutch being engaged to direct power through said continuously variable transmission in bypassing relation with said planetary.

3. The powertrain defined in claim 2 further comprising a first selectively engageable brake for said first reaction member to establish a forward ratio in said planetary gear arrangement and a second selectively engageable brake for said second reaction member to establish a reverse ratio in said planetary gear arrangement.

4. The powertrain defined in claim 3 wherein said first and second reaction members are ring gears, said input member of said planetary gear arrangement is a sun gear and said rotary member of said planetary gear arrangement is comprised of a carrier assembly having intermeshing first and second pinion gears rotatably supported thereon and meshing with the first and second ring gears respectively and said sun gear meshing with said first pinion gear.

* * * * *